(12) United States Patent
Murphy

(10) Patent No.: US 7,542,462 B1
(45) Date of Patent: *Jun. 2, 2009

(54) METHOD AND APPARATUS FOR MULTICAST CALL SIGNALING IN PACKET NETWORK

(75) Inventor: Jim Murphy, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 891 days.

This patent is subject to a terminal disclaimer.

(21) Appl. No.: 10/860,537

(22) Filed: Jun. 2, 2004

Related U.S. Application Data

(63) Continuation of application No. 09/104,483, filed on Jun. 24, 1998, now Pat. No. 6,754,224.

(51) Int. Cl.
*H04L 12/66* (2006.01)
*H04L 12/28* (2006.01)

(52) U.S. Cl. ...................... 370/352; 370/401

(58) Field of Classification Search ....................... None
See application file for complete search history.

(56) References Cited

U.S. PATENT DOCUMENTS

| | | | |
|---|---|---|---|
| 4,506,358 A | | 3/1985 | Montgomery |
| 4,794,639 A | * | 12/1988 | Urui et al. ................ 379/88.19 |
| 5,206,901 A | * | 4/1993 | Harlow et al. ............... 379/211 |
| 5,287,103 A | | 2/1994 | Kasprzyk et al. |
| 5,361,256 A | * | 11/1994 | Doeringer .................. 370/390 |
| 5,600,635 A | * | 2/1997 | Hamaki et al. .............. 370/280 |
| 6,085,101 A | * | 7/2000 | Jain ........................... 370/390 |
| 6,205,139 B1 | * | 3/2001 | Voit ............................ 370/389 |
| 6,240,089 B1 | * | 5/2001 | Okanoue et al. ............ 370/390 |
| 6,272,127 B1 | * | 8/2001 | Golden et al. ............... 370/352 |
| 6,754,224 B1 | * | 6/2004 | Murphy ...................... 370/432 |

* cited by examiner

*Primary Examiner*—Steven H Nguyen
(74) *Attorney, Agent, or Firm*—Stolowitz Ford Cowger LLP

(57) ABSTRACT

Multicasting and telephony call signaling are combined to perform multicast call signaling. Several IP endpoints in a packetized network subscribe to a multicast group. A telephony call setup request is then sent on a multicast address to each of the subscribing endpoints in the telephony multicast group. When an originating endpoint transmits a telephony call setup request using the multicast address, the network replicates and transmits the telephony call setup request to each of the subscribing endpoints belonging to the telephony multicast group associated with that multicast address. When the setup request reaches the subscribing endpoints, each endpoint sends an alert signal using the multicast address to indicate the presence of a telephony device at that endpoint. Telephony devices at each of the subscribing endpoints can then begin notifying a user of the incoming call. When a response to the telephony call setup request is initiated by one of the telephony devices, a connect signal is transmitted from a responding endpoint using multicast address. A connection is then established between the originating endpoint and the responding endpoint. The multicast address or a point to point connection can be used to carry the voice and/or video data in addition to the signaling data once the connection is established.

11 Claims, 4 Drawing Sheets

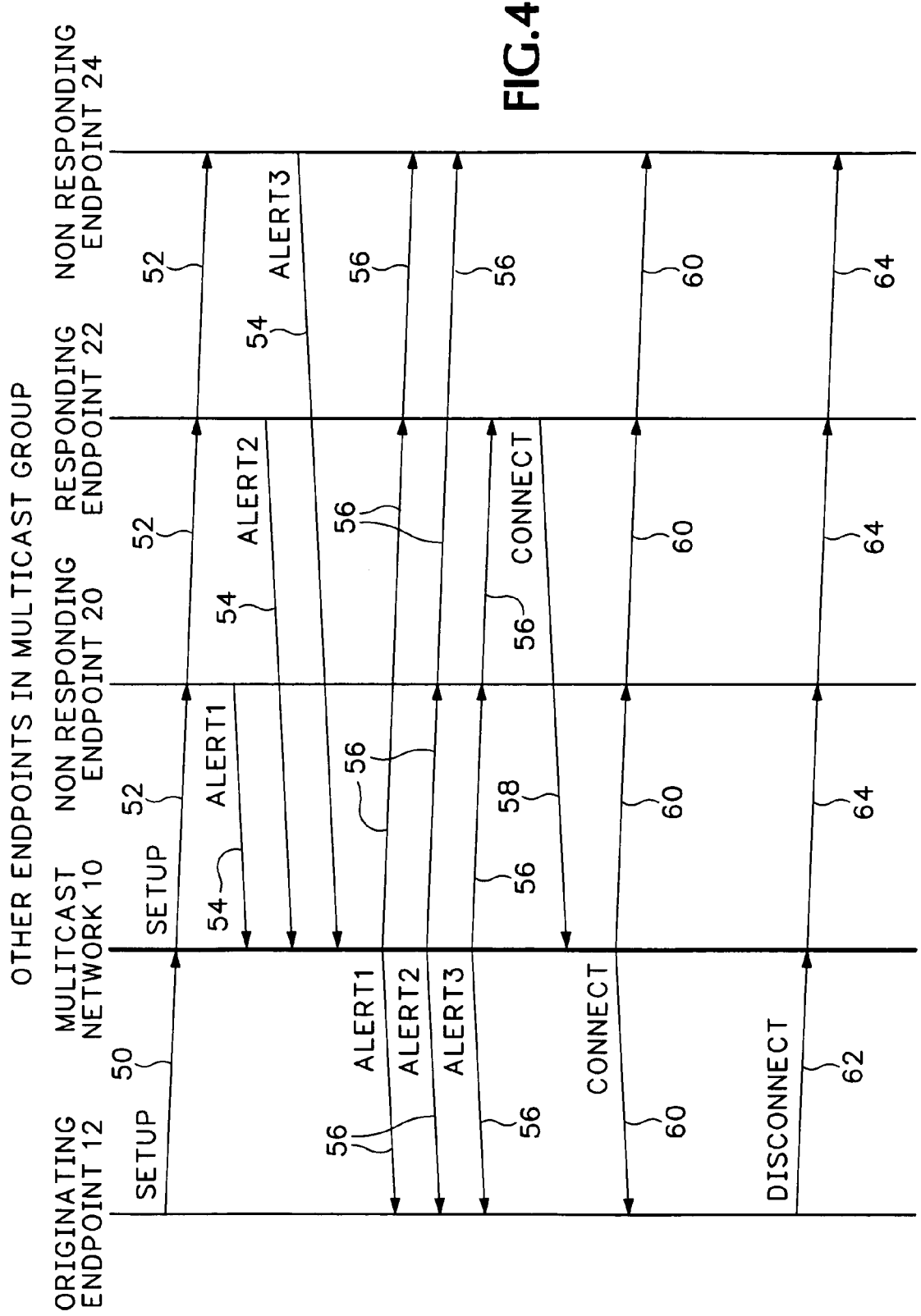

METHOD AND APPARATUS FOR MULTICAST CALL SIGNALING IN PACKET NETWORK

CROSS-REFERENCE TO RELATED APPLICATIONS

This application is a continuation of prior U.S. patent application Ser. No. 09/104,483, filed Jun. 24, 1998, issued as U.S. Pat. No. 6,754,224.

BACKGROUND OF THE INVENTION

This invention relates generally to call signaling and, more specifically, however, to using multicast call signaling in a packet network.

Conducting voice communications over a packet network is desirable because companies typically use 50% or less of available network bandwidth. Therefore, putting company voice traffic on the same packet network used to transmit data can save long distance charges and allow for greater communication options. Sending voice data on IP networks is therefore extremely desirable when there is a guaranteed bandwidth.

Call signaling techniques in packet networks traditionally route signaling data serially, or sequentially, such that a response is sought from only one endpoint at a time. If a first endpoint fails to respond to the request, then the request is sent to a second endpoint. If no response is obtained from the second endpoint the request is sent to a third endpoint, and so on. A conventional telephony call forwarding technique is used to connect with a user at any one of multiple locations—such as attempting to contact someone whether they are at the office by an office phone, at home by a home phone, or away from home and the office by a cell phone or a pager—operates as follows. First, the telephony system attempts to reach the desired party at the office by signaling (calling) the office phone. If no response is obtained at the office, the system calls the home phone. If no response is received from the home phone, then the cell phone is signaled. Finally, the pager is contacted if no response was obtained from any of the previous devices. When a response is finally obtained, either from a live-person contact, from an answering machine, or from any other type of coverage device (i.e., voice mail), the signaling sequence stops and no further devices are signaled.

Unfortunately, not only does this system consume a great deal of time trying to track down the desired party, it also breaks down when there is an answering machine or voice messaging device at one of the endpoints. When the answering machine or voice mail system establishes a connection with the caller, the call forwarding process stops and the desired contact must be obtained by calling each phone number manually.

Another problem related to sequential call signaling involves conference calling. Conference calls generally require that each party be contacted separately. Specifically, one party is typically called and put on hold while the next party is contacted. This process continues until all of the desired parties are finally contacted. Again, this method is time consuming and burdensome. Scalability is also a significant problem because all of the work done in contacting the desired parties is done at the initiating endpoint.

The existing audio transport protocol used in IP networks H.323 is derived from traditional telephone networks and is not highly scalable in packet networks or even Local Area Network (LAN) environments. Telephony based protocols are also complex and bulky and require centralized control. Thus, these traditional audio transport protocols are not easily implemented in low cost devices such as cable modems, phones, and pagers because of the intensive processing requirements.

Therefore, a need remains for a scalable and easily implemented packet-based call signaling system that contacts multiple communications devices at the same time. The industry would also benefit from a call signaling system that allows multiple parties to be contacted for participation in a conference call, without the need to separately call each desired party.

SUMMARY OF THE INVENTION

One object of the present invention is to provide a call signaling system that allows multiple endpoints to receive a call setup request.

Another object of the present invention is to provide a method of call signaling that allows multiple parties to be contacted without having to independently call each party.

A further object of this invention is to provide a scalable system for call signaling multiple endpoints.

The present invention is a call signaling system that takes advantage of multicasting technology. The invention sends signaling data in packets having multicast addresses so that multiple endpoints are contacted while sending only one setup signal.

By using a multicast address for telephony signaling, telephone calls can be sent to several telephony devices (i.e. an office phone, a cell phone, a home phone, a pager, etc.), all at the same time. A live-person contact can therefore be sought in several locations simultaneously, eliminating the prior art need for contacting each location sequentially or independently. Furthermore, the invention allows conference calls to be accomplished faster because each of the desired parties can be contacted at the same time, eliminating the need for sequential, independent phone calls to each party.

To achieve these desired results, the invention synthesizes multicasting with call signaling to perform multicast call signaling. Several network endpoints subscribe to and thereby become members of a telephony multicast group. The subscribing endpoints then send call signaling packets (call setup requests) using a multicast address to each of the other members of the multicast group. Each of the subscribing endpoints is notified of a signaling state for each of the other members of that group. Therefore, when one member becomes active (i.e., transmits a call setup request), each of the other members becomes aware of this and can activate devices that notify a user. Of course, the multicast group can also still be used to carry the voice and/or video data in addition to the signaling data.

The invention is more scalable than prior art systems other than the transmission of the telephony call setup request from the originating endpoint, the network and the receiving endpoints do most of the call processing. This approach allows for more distributed processing and accordingly allows for more powerful and scalable implementations.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 4 is a diagram illustrating the call signal paths for the multicast call signaling system shown in FIG. 2.

DETAILED DESCRIPTION OF THE PREFERRED EMBODIMENTS

Multicast technology is used to send call signaling packets along a packet network to multiple endpoints. For example, the invention allows a telephone signal to be sent to an office phone, a cell phone, a home phone, a pager, etc., all at the same time. In this way, a desired user can be contacted at all of these telephony devices without requiring sequential and independent calls to each device. Similarly, conference calls can be accomplished much faster. By using a multicast address in a multicast packet network, an originating endpoint can contact each of the desired parties in the conference call with a single call setup request. The packet network sends the call setup request to each of the desired endpoints, which can each respond to the setup request and join the conference call. The invention thereby eliminates the need for sequential phone calls to each desired party in order to initiate the conference.

Figure 1:
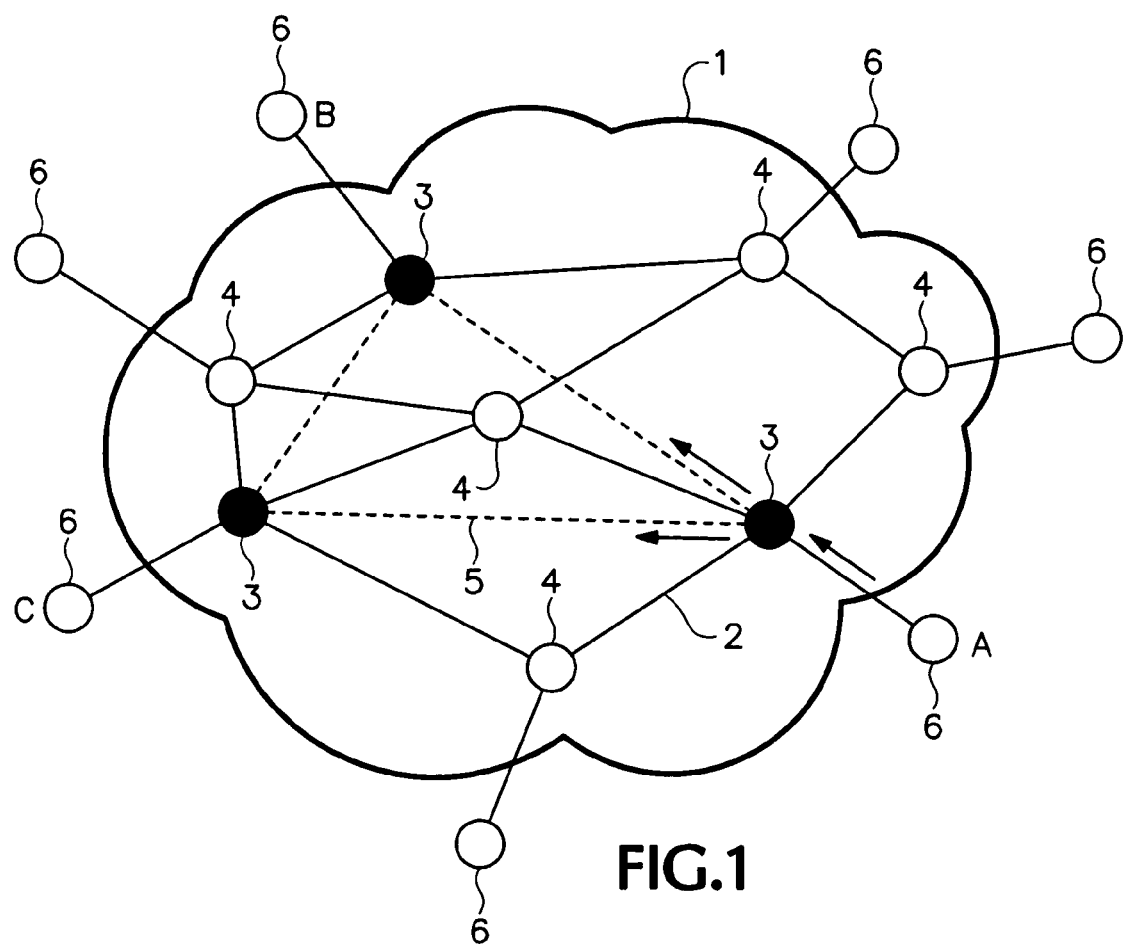
FIG. 1 is a schematic illustration of a packet network including a Multicast backbone (Mbone) network.

FIG. 1 is a schematic depiction of a packet network 1 and an overlying Mbone network 2.

Multicasting has been developed as a way to send information packets to multiple Internet Protocol (IP) endpoints simultaneously. Internet multicasting generally takes advantage of a multicast backbone (Mbone) network 2, which is basically an overlay network on top of a packet network 1. MBONE sites 4 are equipped with special software to send and receive packets at high speed using the IP one-to-many multicasting protocol.

The packet network 1 consists of routers 4 and switches, etc. used in part for routing multicast packets. Only a subset of the internet routers are part of the Mbone 2 and are used for multicasting. A route tree 5 is built and packets having a multicast address are efficiently routed to all of the nodes 3 on the route tree 5.

Certain IP addresses are designated as multicast addresses and only multicast routers 3 and 4 are able to distinguish the multicast addresses from other IP addresses. The multicast routers 3 and 4 respond to packets over a particular multicast address range. The designated multicast packets are identified and distributed by the multicast routers 3 and 4 to each of the subscribing endpoints 6 belonging to that multicast group. Each endpoint 6 in any multicast group can send a data packet out on a multicast address and know that the other endpoints 6 which belong to that multicast group will receive it.

For example, when a multicast address packet is sent out on the Mbone 2 from an originating endpoint A, the network 1 knows that the packet is addressed to a multicast group and will send the packet out to every other endpoint designated as belonging to that multicast group (i.e., B and C). Accordingly, even though the originating endpoint A only sent out one packet, because it was sent out using this multicast address, the packet shows up at each endpoint B, C belonging to the specified multicast group. Multicasting therefore allows a single packet to be efficiently sent to multiple endpoints at the same time.

Although multicasting is becoming more and more common, multicast technology has traditionally been concerned only with transmitting data over a multicast network, and has not been used for telephony call signaling. Although people have used multicasting to send voice signals to multiple users, multicasting has never been used with call signaling to notify multiple endpoints of a telephone call at the same time.

Telephony call signaling in the prior art has failed to utilize multicast technology. Existing signaling techniques generally have been designed to reach only a single endpoint at a time and thereby establish a point to point connection if the user is present. An example of this is the typical phone call or facsimile transmission where a phone number is dialed to seek and establish a connection with a user or communications device at a specific endpoint.

Figure 2:
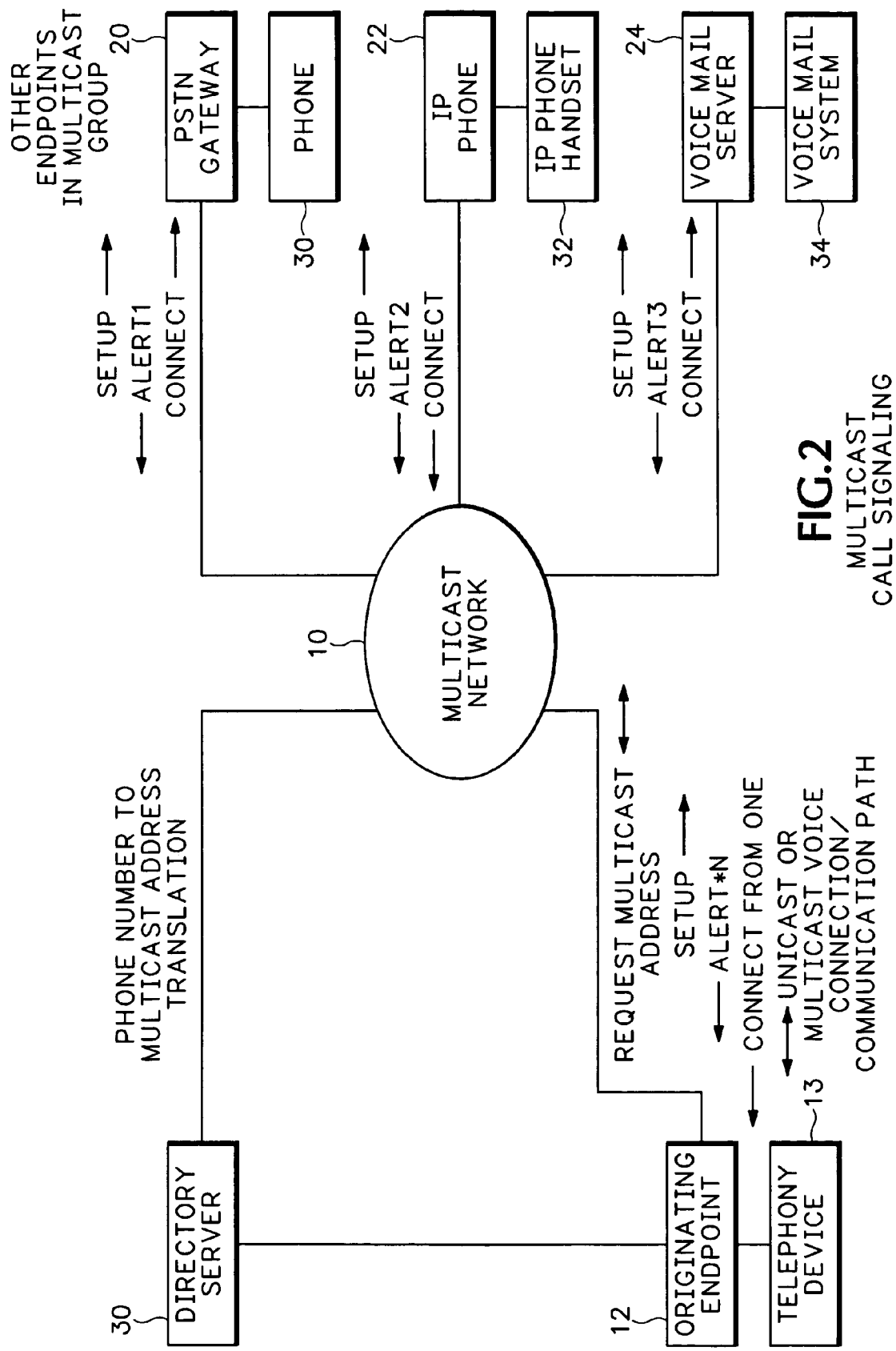
FIG. 2 is a schematic illustration of a multicast call signaling system according to the present invention.

FIG. 2 is a schematic illustration of a multicast call signaling system according to the invention. A packet network 10 is alternatively referred to as a Multicast network or simply the network. As described above, multicasting allows endpoints to send packets using a single multicast address to a multicast group on a network. The network 10 sends the packets to each of the endpoints subscribing to that particular multicast group.

A telephony call SETUP originates from an originating endpoint 12 and uses a multicast address corresponding to a telephony multicast group on the network 10, including endpoints 20, 22 and 24. The originating endpoint 12 is typically a computer or network server connected to a phone, computer, pager, or any other kind of telephony device 13. The endpoint 12 is unaware of which other endpoints have subscribed to the telephony multicast group. The originating endpoint 12 is only aware of a phone number corresponding to the multicast address to which the setup request SETUP was sent. Subscribing endpoints 20, 22, and 24 (i.e., members of the telephony multicast group) are configured as part of that group at the network level.

The telephony device 13 connected to the originating endpoint 12 dials a phone number which is translated into a multicast address corresponding to the desired telephony multicast group. Translation of the phone number into a multicast address is accomplished using a directory server 30, which could either be located on the network 10 or configured into the originating endpoint 12.

After the telephony device 13 dials the phone number, the endpoint 12 sends a telephony call setup request (in the form of a signal packet) SETUP out to the network 10 via the directory server 30. The directory server 30 converts the phone number into a multicast address which is sent with the telephony call setup request SETUP on network 10. The network 10 identifies the SETUP request as having a multicast address and in turn replicates the SETUP signal packet. The replicated signal packets SETUP are then sent by the network 10 to each of the endpoints 20, 22, and 24 belonging to the multicast group. Telephony devices 30, 32 and 34 connected to each of the subscribing endpoints 20, 22, and 24, respectively, receive the SETUP request.

Upon receiving the SETUP request, each of the endpoints 20, 22, and 24 send back alert signals ALERT1, ALERT2, or ALERT3, respectively. The alert signals ALERT1, ALERT2 and ALERT3 are sent back using the same multicast address and hence go to the originating endpoint 12 and to each of the subscribing endpoints 20, 22, and 24. The alert signals ALERT1, ALERT2 and ALERT3 each indicate that there is a telephony device connected to that particular endpoint.

The alert signals may also include information about the type of telephony device, or type of service offered by the telephony device, connected to that endpoint.

Upon receipt of the telephony SETUP request, the devices 30, 32 and 34 at endpoints 20, 22 and 24, respectively, can either notify a user of the call, or, if they are merely coverage devices, monitor the status of the call and respond when appropriate conditions are satisfied. For example, a phone 30 is the telephony device at PSTN gateway endpoint 20, a handset 32 is the device connected to an IP phone 22 and a voice mail system 34 is the device connected to a voice mail server 24.

In summary, the SETUP request is transmitted from the originating endpoint 12 using the multicast address and from there is sent to all of the subscribing endpoints 20, 22, and 24. All of the subscribing endpoints 20, 22, and 24 to which there is a telephony device 30, 32, and 34 attached then sends an alert signal back over the network 10, indicating the presence and also perhaps the nature of the telephony device. At the same time, the devices 30, 32, and 34 are either notifying a user of the call, monitoring the call status, or performing some other desired function depending on what type of device they are.

Eventually, one or more of the telephony devices 30, 32 and 34 will respond to the incoming call setup request SETUP. For instance, a user-activated telephony device, such as the telephone 30 connected through the PSTN gateway 20, responds to the SETUP request by picking up a handset of the ringing telephone 30. A coverage device, on the other hand, such as the voice mail system 34, typically responds automatically upon meeting a specified precondition (i.e., after five rings).

When one of the telephony devices 30, 32 and/or 34 responds, that device becomes a responding device, and a connection needs to be established with the originating device 13. For example, the IP phone handset 32 responds to the SETUP request from originating endpoint 12. In order to establish this connection, the IP phone becomes a responding endpoint 22 (the subscribing endpoint 22 connected to the responding device 32) and sends a connect signal CONNECT using the multicast address. When the CONNECT signal is sent using the multicast address, the network 10 knows that it needs to send that packet to each of the subscribing endpoints 20, 22 and 24 in the multicast group, including the originating endpoint 12. The CONNECT signal is therefore multicast by the network 10 to each of the subscribing endpoints 20, 22 and 24 who are now informed of the pending connection between the originating endpoint 12 and the responding endpoint 22.

If desired, an indication signal could also be sent by the responding endpoint 22, which, in addition to conveying the above-described connect signal CONNECT, also includes an identification signal, indicating what type of device 32 is connected to the responding endpoint 22. Alternatively, the identification signal could merely classify the type of service offered by the responding device 32, i.e., by identifying the connection as either a coverage connection or a real connection. Coverage connection classification indicates that the connection is not with a user-activated device but rather with a coverage device, such as an answering machine or voice mail system 34. Classification as a real user connection, on the other hand, indicates that the originating endpoint 12 has connected to a user-activated device, such as a telephone 30 or IP phone handset 32, as opposed to some fallback device such as a pager or voice mail system 34.

When the connect signal CONNECT (or indication signal) is received by the other subscribing endpoints 12, 20 and 24 in the multicast group, they each decide what action to take in response. Particularly, each device can independently choose whether to stop notifying, to indicate a change of state (informing the user that the call has been connected to another device), to keep notifying, or to perform some other specified function.

While the non-responding endpoints decide what to do in response to the CONNECT signal, a connection is being established between the originating endpoint 12 and the responding endpoint 22 (or multiple responding endpoints). Specifically, upon receiving the CONNECT signal from the responding endpoint 22, the originating endpoint 12 acknowledges the CONNECT signal and a communication path (the connection) is established between the originating endpoint 12 and the responding endpoint 22. The communication path can be established using the multicast address itself or can be established through a separate data path (i.e., a point to point connection or a separate multicast address) depending on the application and the support for multicast conferencing.

Once established, the communication path is used to transmit the voice and/or video data between the responding endpoint 22 and the originating endpoint 12. In the embodiment where a point to point connection is established, the multicast network 10 is primarily used for broadcasting the telephony call SETUP request to all of the members 20, 22 and 24 belonging to the telephony multicast group in order to initiate the connection between the originating endpoint 12 and the responding endpoint 22.

Figure 3:
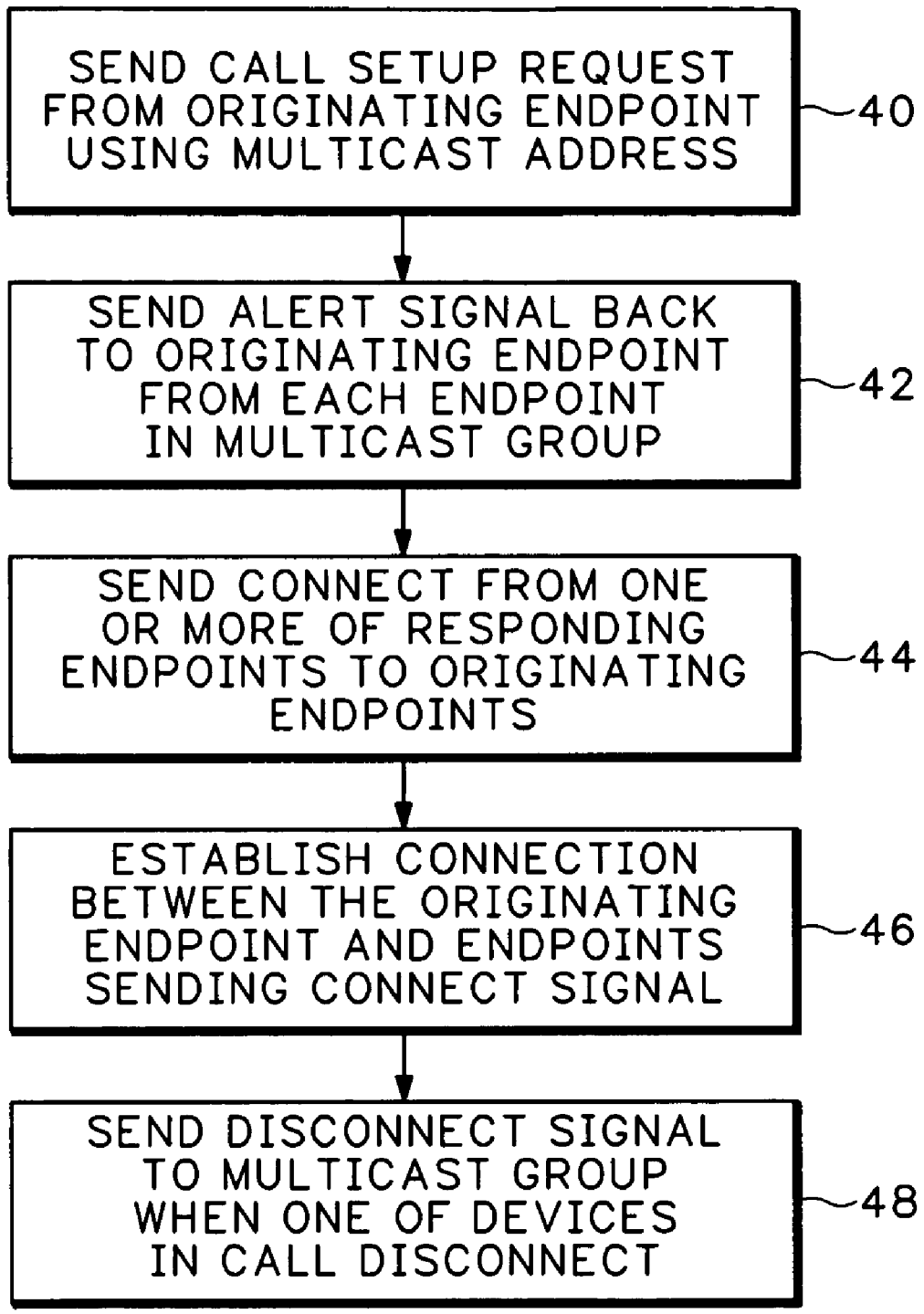
FIG. 3 is a flow diagram showing how multicast call signaling operates according to the present invention.

FIG. 3 is a flow diagram showing a method for multicast call signaling according to the present invention. In step 40, a telephony call setup request is sent from the originating endpoint using a multicast address corresponding to a telephony multicast group on a packetized network. In step 42, an alert signal is sent back to the originating endpoint from each of the subscribing endpoints belonging to the telephony multicast group. The alert signal indicates that a device is present at that endpoint and also the type of device. In step 44, one or more of the responding endpoints sends a connect signal to the originating endpoint 12. Step 46 establishes a connection (or communication path) between the originating endpoint and the endpoint(s) responding with the connect or indication signal. Sending the connect or indication signal using the multicast address results in this signal being sent to all of the other subscribing endpoints in the telephony multicast group. This allows the other non-connecting devices to modify their notification states.

Finally, when one or more of the devices in the call disconnect, for example, device 13 or 32, step 48 sends a DISCONNECT signal to the endpoints in the multicast group. When the call is completely terminated, i.e., when all of the parties to the call have disconnected, the call is cleared from the network 10.

FIG. 4 is a diagram showing how multicast signaling events are routed to the different endpoints according to the invention. The originating endpoint 12 sends a SETUP command to packet network 10 in step 50. The SETUP command is multicast over network 10 to endpoints 20, 22 and 24 in step 52. The endpoints 20, 22 and 24 acknowledge the SETUP request by generating with ALERT1, ALERT2 and ALERT3 signals, respectively, in step 54. The ALERT1, ALERT2 and ALERT3 responses are multicast over network 10 to each endpoint in the multicast group in step 56.

Only endpoint 22 responds to the SETUP signal by sending a CONNECT signal in step 58 over network 10. The CONNECT signal is multicast to all endpoints in the multicast group in step 60. A telephone connection is then established between endpoint 12 and endpoint 22. The connection is terminated by endpoint 12. A DISCONNECT signal is sent by endpoint 12 using a multicast address in step 62. The network 10 then multicasts the DISCONNECT signal to all other endpoints in the multicast group in step 64.

There are several applications for this technology in addition to those applications identified previously. One of those possible applications is in "Find Me" services. Each user subscribing to the "Find Me" service would be allocated a multicast address. All endpoints belonging to that user would then join a telephony multicast group corresponding to the multicast address and monitor the call signaling packets for that multicast group. When a new call arrives for the user, from a public switch telephone network (PSTN) to a voice to IP (VoIP) gateway, for instance, call signaling packets (telephony call setup requests) notifying the user of the new call are sent to all of the subscribing endpoints belonging to the multicast group. These endpoints can include the user's PC, a VoIP gateway connected to a Private Branch Exchange (PBX), a VoIP gateway connected to the user's cell phone, a voice mail box, or other telephony devices. Each of the receiving endpoints then begin alerting the originating endpoint of the presence of a device at the receiving endpoint as those devices begin notifying, i.e. ringing, flashing, etc., to notify the user of the incoming call.

When the user answers the call from one of the endpoints, or when it is answered by a voice mail or answering system, a connect signal is sent to all other endpoints. At this time, each of these endpoints can optionally decide how to respond to the connect signal. Each device can independently decide whether to stop notifying completely or whether to alter the form of the notification in order to indicate that a call is occurring on the group. Altering notification would allow the user to decide to interrupt a voice mail session, for instance. Other devices, such as a pager, can decide to contact the user when the voice mail session is complete. Streaming multiple calls on a single multicast address is facilitated as well as allowing relatively straightforward extensions for multicast teleconferencing.

A slightly different application of multicast telephony call signaling is in a class of features known as "hoot and holler," or "shout down." For instance, stockbrokers across the country might be contacted by an investor who wants to talk to any of them, but doesn't care which one. The investor would pick up the phone and dial into his investment multicast group. The phones belonging to each of the stockbrokers associated with his multicast group would then start ringing. One or more of the stockbrokers could then answer and start talking. The other phones associated with endpoints in the multicast group would become aware of the connection between the investor and the other stockbroker(s) and would then be placed in a standby mode, notifying the stockbroker at that location that there is a conversation taking place on this multicast group. Those stockbrokers could then decide whether to pick up the phone and join in the conversation or to ignore the standby notification.

This invention also can be used with cellular telephone networks. One of the things made possible by this invention is a more effective "handoff" technique. Doing handoffs from one base station to another can be made more efficient by incorporating base stations into a multicast group. As signaling comes in, it would go to each of the base stations because there is ambiguity as to which base station is actually in control.

Another application for the invention provides a recording endpoint as one of the subscribing endpoints. A recording endpoint would never initiate a connect with the originating endpoint, but it would recognize the connect signal returned from the responding endpoint and then participate in the connection between the originating endpoint and the responding endpoint in order to record a conversation occurring over the communications path. This embodiment is extremely useful for technical support or customer service applications where calls are recorded to monitor service quality. It would also be beneficial to lawyers or other professionals who wanted to have recordings of conversations with their clients, for example. The recording endpoint is configured for selective activation or deactivation by the originating endpoint, or other endpoints if desired.

This invention is primarily a software protocol feature and therefore any IP endpoint can be used to facilitate the invention. Traditional VoIP gateways and trunking protocols can be easily manipulated to utilize this invention. The invention is useful for both Internet Service Providers (ISPs) and corporate intranets.

Multicast telephony call signaling is more efficient than the sequential call signaling techniques of the prior art. Furthermore, existing protocols, such as H.323, are derived from traditional telephony systems and are not highly scalable in the internet environment. They are also complex and require centralized control to be user efficient. Thus, they are not easily implemented in low cost devices such as cable modems, phones, and pagers. The invention provides a highly distributed solution that is very scalable and is easily implemented in even low cost telephony devices. The increased scalability and ability to implement the invention results from the fact that, other than the transmission of the telephony call setup request from the originating endpoint, the network and receiving endpoints do most of the call processing.

Having described and illustrated the principles of the invention in its preferred embodiments, it should be apparent that the invention can be modified in arrangement and detail, by one skilled in the art, without departing from such principles. Additional applications and modifications will be apparent to those skilled in the art. Therefore, all modifications and variations are claimed which come within the spirit and scope of the following claims.

The invention claimed is:

1. A method for multicast telephony call signaling comprising:
    transmitting telephony call setup requests over a packet network from an originating source to a plurality of subscribing endpoints, wherein a multicast address is used for a substantially simultaneous distribution of the requests to the subscribing endpoints of the multicast address;
    receiving an alert message response from at least one of the plurality of endpoints, wherein the alert message identifies a type of a communication device at each responding endpoint;
    establishing at least one call connection between the originating source and at least one of the plurality of endpoints from which an alert message has been received; and
    sending a connect signal, in response to establishing the at least one call connection, to the subscribing endpoints using the multicast address to notify the subscribing endpoints that a communication path will be established over the packet network with the originating source.

2. The method according to claim 1, further comprising: distinguishing, from the alert message, whether a communication device at an endpoint is a coverage communication device or a user communication device.

3. The method according to claim 1, further comprising: responding to the at least one received alert message according to the identified type of device.

4. The method according to claim 1, wherein the telephony call setup requests invite the establishment of a Voice Over internet Protocol (VoIP) call over the same packet network used in receiving the alert message.

5. The method according to claim 1, further comprising: notifying a user of a telephony device of a call setup request.

6. The method according to claim 1, further comprising: notifying the subscribing endpoints of a termination of the call connection.

7. A system comprising:

means for transmitting telephony call setup requests over a packet network from an originating source to a plurality of subscribing endpoints, wherein a multicast address is used for a substantially simultaneous distribution of the requests to the subscribing endpoints of the multicast address;

means for receiving an alert message response from at least one of the plurality of endpoints, wherein the alert message identifies indicates a type of communication device at each responding endpoint;

means for establishing at least one call connection between the originating source and at least one of the plurality of endpoints from which an alert message has been received; and means for sending a connect signal, in response to establishing the at least one call connection, to the subscribing endpoints using the multicast address to notify the subscribing endpoints that a communication path will be established over the packet network with the originating source.

8. The system of claim 7, further comprising:

means for using the call setup requests to establish call connections between the originating source and at least one of the plurality of subscribing endpoints.

9. The system of claim 8, further comprising:

means for receiving a connect signal from at least one of the plurality of subscribing endpoints.

10. The system of claim 8, further comprising:

means for receiving a disconnect signal from at least one of the plurality of subscribing endpoints.

11. The system of claim 7, further comprising:

means for notifying the plurality of subscribing endpoints of a termination of the at least one call connection.

* * * * *